(12) United States Patent
Maykol Gomes Pinto et al.

(10) Patent No.: US 11,503,269 B2
(45) Date of Patent: Nov. 15, 2022

(54) HYBRID IMAGING SYSTEM FOR UNDERWATER ROBOTIC APPLICATIONS

(71) Applicant: INESC TEC—INSTITUTO DE ENGENHARIA DE SISTEMAS E COMPUTADORES, TECNOLOGIA E CIÊNCIA, Oporto (PT)

(72) Inventors: Andry Maykol Gomes Pinto, Oporto (PT); Anibal Castilho Coimbra De Matos, Oporto (PT)

(73) Assignee: INESC TEC—INSTITUTO DE ENGENHARIA DE SISTEMAS E COMPUTADORES, TECNOLOGIA E CIÊNCIA, Oporto (PT)

( * ) Notice: Subject to any disclaimer, the term of this patent is extended or adjusted under 35 U.S.C. 154(b) by 121 days.

(21) Appl. No.: 17/044,171

(22) PCT Filed: Apr. 9, 2019

(86) PCT No.: PCT/IB2019/052926
§ 371 (c)(1),
(2) Date: Sep. 30, 2020

(87) PCT Pub. No.: WO2019/197995
PCT Pub. Date: Oct. 17, 2019

(65) Prior Publication Data
US 2021/0037229 A1 Feb. 4, 2021

(30) Foreign Application Priority Data

Apr. 9, 2018 (PT) .......................................... 110671
Apr. 28, 2018 (EP) ..................................... 18169993

(51) Int. Cl.
*H04N 13/254* (2018.01)
*G01S 17/89* (2020.01)
(Continued)

(52) U.S. Cl.
CPC .......... *H04N 13/254* (2018.05); *G01S 17/86* (2020.01); *G01S 17/89* (2013.01); *H04N 13/239* (2018.05); *H04N 13/296* (2018.05)

(58) Field of Classification Search
CPC ............... H04N 13/254; H04N 13/296; H04N 13/239; G01S 17/86; G01S 17/89
(Continued)

(56) References Cited

U.S. PATENT DOCUMENTS 9,753,140 B2    9/2017  Cottrell

FOREIGN PATENT DOCUMENTS

WO    WO 2011107987 A1    9/2011
WO    WO 2014060562 A1    4/2014

OTHER PUBLICATIONS

Bonin-Font, F. Oliver, G. Wirth, S. Massot, M. Luis Negre, P. Beltran, J.-P.: "Visual sensing for autonomous underwater exploration and intervention tasks", Ocean Engineering, vol. 93, 2015, pp. 25-44.
(Continued)

*Primary Examiner* — Nguyen T Truong
(74) *Attorney, Agent, or Firm* — Leason Ellis LLP

(57) ABSTRACT

Hybrid imaging system for 3D imaging of an underwater target, comprising: two optical image sensors for stereoscopic imaging; a switchable structured-light emitter having different wavelengths; a switchable spatially non-coherent light source; a data processor configured for alternating between operating modes which comprise: a first mode wherein the structured-light emitter is activated, the light source is deactivated and the image sensors are activated to capture reflected light from the structured-light emitter, and a second mode wherein the structured-light emitter is deactivated, the light source is activated and the image sensors are activated to capture reflected light from the light source;
(Continued)

wherein the data processor is configured for delaying image sensor capture, on the activation of the structured-light emitter and on the activation of the light source, for a predetermined time such that light reflected from any point closer than the target is not captured.

14 Claims, 8 Drawing Sheets

(51) Int. Cl.
*H04N 13/296* (2018.01)
*H04N 13/239* (2018.01)
*G01S 17/86* (2020.01)

(58) Field of Classification Search
USPC .......................................................... 348/47
See application file for complete search history.

(56) References Cited

OTHER PUBLICATIONS

Bruno, F. Bianco, G. Muzzupappa, M. Barone, S. Razionale, A.: "Experimentation of structured light and stereo vision for underwater 3d reconstruction", ISPRS Journal of Photogrammetry and Remote Sensing, vol. 66, No. 4, 2011, pp. 508-518.

Hansen, N. Nielsen, M. C. Christensen, D. J. Blanke, M.: "Short-range sensor for underwater robot navigation using line-lasers and vision", IFAC-PAPERSONLINE, vol. 48, No. 16, 2015, pp. 113-120.

Hirschmuller, H.: "Stereo Processing by Semiglobal Matching and Mutual Information", IEEE Transactions on Pattern Analysis and Machine Intelligence, vol. 30, No. 2, 2008, pp. 328-341.

Oleari, F. Kallasi, F. Rizzini, D. L. Aleotti, J. Caselli, S.: "An underwater stereo vision system: From design to deployment and dataset acquisition", Oceans 2015—Genova, May 2015 (May 1, 2015), pp. 1-6.

Sarafraz, A. Haus, B. K.: "A structured light method for underwater surface reconstruction", ISPRS Journal of Photogrammetry and Remote Sensing, vol. 114, 2016, pp. 40-52.

Miquel Massot-Campos et al, "Optical Sensors and Methods for Underwater 3D Reconstruction", Sensors, vol. 15, No. 12, Dec. 15, 2015 (Dec. 15, 2015), p. 31525-31557.

Massot-Campos Miquel et al, "Structured light and stereo vision for underwater 3D reconstruction", Oceans 2015—Genova, IEEE, May 18, 2015 (May 18, 2015), p. 1-6.

C. S. Tan et al., "Range Gated Imaging System for Underwater Robotic Vehicle", Oceans 2006, Asia Pacific, May 1, 2006 (May 1, 2006), p. 1-6.

HYBRID IMAGING SYSTEM FOR UNDERWATER ROBOTIC APPLICATIONS

CROSS-REFERENCE TO RELATED APPLICATIONS

This application is a U.S. National Stage Application under 35 U.S.C. § 371 of International Patent Application No. PCT/IB2019/052926, filed Apr. 9, 2019, which claims priority to European Patent Application No. 18169993.5, filed Apr. 28, 2018 and Portugal Patent Application No. 110671, filed Apr. 9, 2018, the contents of which are each hereby incorporated by reference in their respective entireties.

TECHNICAL FIELD

The present disclosure relates to a hybrid imaging system with particular application for underwater robotic operations.

BACKGROUND

The developments in the field of visual perception have contributed to the appearance of new and sophisticated autonomous robots. Acoustic sensors are often used by underwater applications to conduct bathymetric surveys, obstacle avoidance and long-range navigation. However, they have severe limitations related with the cost and the inability to provide texture information and low sampling frequencies. On the contrary, optical systems can provide dense and accurate texture information updated at high speed, which is crucial for tasks such as, underwater manipulation, oceanographic studies and marine biology, shipwreck surveys and object identification. Although optical systems can increase the feasibility of missions that are be carried out by AUVs, they need to be specifically designed to overcome the photometric limitations of sub-sea conditions namely, poor visibility due to light attenuation and scattering and caused by suspended particles in the medium or abundance of marine life, non-uniform lighting and colour filtering.

Conventional systems for 3D reconstruction are usually classified in passive or active imaging techniques.

Underwater passive imaging uses ambient sunlight at shallow waters or light sources (i.e., spotlights and LEDs) at deeper waters just to ensure a sufficient lighting of the scene. This category is based on photogrammetry where information of the scene taken from different viewpoints is used for underwater 3D acquisition. A stereoscopic system estimates the stereo correspondence from images obtained by different viewpoints and, this technique is often used for close and medium range acquisition. Usually, conventional stereoscopic setups are formed by two industrial cameras and the estimation of the point cloud is conducted by a SAD (Standard Absolute Differences correlation method) which provides an acceptable quality. These systems do not provide additional imaging methodologies to accommodate the photometric limitations of underwater environments.

Oleari et al. (2015) [1] demonstrates a stereoscopic setup formed by two industrial cameras, but this systems does not accommodate the photometric limitations of underwater environments. Experiments conducted in a water pool with different light conditions (sunny, cloudy and night using vehicle lights) but without turbidity constraints have demonstrated the challenges of perceiving the underwater environment, in particular, the balance between the illumination of scene and the camera shutter. An advanced vision system [2], formed by two stereoscopic cameras (Bumblebee sensors) enhances the maneuverability and manipulation capability of underwater robots. This system is called Fugu-f, has a depth rate of 250 m and can be adaptable to different vehicles. The results demonstrated that this system can be used for different tasks (such as, object detection and grasping) however, a quantitative analysis of the accuracy of Fugu-f for 3D mapping is missing.

Underwater active imaging uses the projected pattern of light to determine the distance between the device and the illuminated target by means of time-of-flight or triangulation principle. There was been a recent interest regarding to underwater active sensors since they are typically employed for long and medium range acquisitions and enhance the quality of images perceived by the receiver by controlling a light pattern. A laser-based range sensor for underwater environments formed by one camera and two lasers projecting continuous vertical lines is presented in [3]. The authors have reported a calibration error of 5% and results obtained in a controlled tested scenario (with very clear water) showed a set of measurements with a drift close to 0.04 m.

The work presented in Bruno et al. (2011) [4] concludes that the structured light can be used in underwater environments and the authors have reported good results for a 3D reconstruction in low turbidity waters. The solution presented requires a camera, projector and a physical structure capable of protecting the entire system when it is submerged in water. The presence of a projector in this kind of applications makes it possible to conduct range measurements with a well-defined pattern that is normally projected in the scene however, the electric power required by this device is non-negligible since it reduces the autonomy of a robotic vehicle. The work of Amin and Brian (2016) [5], extends a structured light technique based on a camera below water and a projector fixed above water. Thus, the scene is illuminated with spatially varying intensity patterns to allow the extraction of the 3D surface of objects. Despite of its accuracy, this technique can only be used in specific case-scenarios where the observer is standing still. Advances in remote visual sensing technology have been followed closely by advances in the artificial illumination.

Currently, the limited visual perception capability of AUVs restricts the use of such vehicles to medium/long range missions. Therefore, the development of visual methods for enhancing the perception of elements in underwater could be extremely useful for robotic operations in murky and in medium and highly turbid underwater environments.

REFERENCES

[1] Oleari, F., Kallasi, F., Rizzini, D. L., Aleotti, J., Caselli, S., May 2015. An underwater stereo vision system: From design to deployment and dataset acquisition. In: OCEANS 2015—Genova. pp. 1-6.

[2] Bonin-Font, F., Oliver, G., Wirth, S., Massot, M., luis Negre, P., Beltran, J.-P., 2015. Visual sensing for autonomous underwater exploration and intervention tasks. Ocean Engineering 93, 25-44.

[3] Hansen, N., Nielsen, M. C., Christensen, D. J., Blanke, M., 2015. Short-range sensor for underwater robot navigation using line-lasers and vision. IFAC-PapersOnLine 48 (16), 113-120, 10th IFAC Conference on

[4] Bruno, F., Bianco, G., Muzzupappa, M., Barone, S., Razionale, A., 2011. Experimentation of structured light and stereo vision for underwater 3d reconstruction. ISPRS Journal of Photogrammetry and Remote Sensing 66 (4), 508518.

[5] Sarafraz, A., Haus, B. K., 2016. A structured light method for underwater surface reconstruction. ISPRS Journal of Photogrammetry and Remote Sensing 114, 40-52.

[6] Hirschmuller, H., 2008. Efficient belief propagation for early vision. IEEE transactions on pattern analysis and machine intelligence 30 (2), 328-341.

GENERAL DESCRIPTION

It is disclosed a visual imaging system that is able to provide dense and accurate 3D information in hash underwater environments using both active and passive imaging methods: multiple light stripe range and a photometric stereo technique, respectively. This hybrid approach combines information from these imaging techniques to extend the measurement range and to produce high density 3D estimations in dynamic underwater environments. Moreover, the disclosed system can synchronize and match the acquisition of images with sub-sea phenomena which leads to clear pictures (with a high signal-to-noise ratio). This hybrid system is driven by a gating timing approach to reduce the impact of several photometric issues related to the underwater environments such as, diffuse reflection, water turbidity and non-uniform illumination.

It is therefore an object of the present invention to provide a hybrid imaging system that is capable of perceiving 3D structures in underwater scenarios. The advantages of the disclosure, when compared to conventional visual sensors, includes reducing the photometric limitations that usually affect imaging solutions operating in underwater scenes (mitigates the underwater effects related to the light propagation in deep waters) and increases the density, robustness and accuracy of 3D points extracted by the disclosure. In particular, by having the same image sensors for both structured and isotropic light using a switched approach, an improved 3D reconstruction is obtained, the system is less complex and also less energy consuming.

The light interacts with the water medium through two phenomena: absorption (loss of power which depends on the index of refraction of the medium) and scattering (deflection from a straight-line propagation path). Thus, the irradiance E(r) at position r can be described as a function of the absorption and scattering coefficients of the medium. Under these terms, a simple analysis can be conducted by considering the Lambert-Beer empirical law along with the assumption of a homogeneous and isotropic water medium. Equation 1 demonstrates how both components (scattering and absorption) decrease the contrast and attenuate the light intensity of images.

$$E(r)=E(0)e^{-ar}e^{-br}; \qquad (1)$$

where a and b are the absorption and scattering coefficients. Considering the image formation model of Jaffie-McGlamery [6], an underwater image can be expressed as the linear superposition of the direct component ($E_d$), the forward-scattered component ($E_f$) and the backscatter component ($E_b$), see equation 2.

$$E_T=E_d+E_f+E_b; \qquad (2)$$

where $E_T$ is the total irradiance. The $E_b$ represents the light that does not contain information about the object since it was reflected by the medium. The $E_b$ adds a noise component and reduces the image contrast. The $E_f$ represents the amount of light reflected by the object which is forward scattered at small angles. Its practical evidence is an image blur. The majority of research works available in the literature are usually focused on proposing post-processing methods to mitigate $E_f$ and $E_b$ components. This research work takes a different path by incorporating a set of imaging principles and techniques directly into an optical system. These innovations aim to increase the robustness of the image formation process by minimizing the influence of $E_b$ (and $E_f$).

The advantage of the disclosed imaging system when compared to conventional visual sensors relies on the fact that it was developed with set of features to reduce the photometric limitations that usually affect imaging solutions operating in underwater scenes. The disclosed imaging system combines a hybrid-based visual approach controlled by a range-gated imaging scheme with a data-driven formulation. The internal architecture of the disclosed imaging system is formed by three main modules according to an embodiment: multiple Light Stripe Range (LSR), Photometric Stereo (PS) and the Range-Gated Synchronizer. The 3D information received from the LSR and the PS modules are combined and filtered in a fourth module named, 3D fitting and texture. These modules are organized in a functional structure, see FIG. 2.

The hardware of disclosed imaging system is formed by two cameras (left and right), two laser stripes (red and green wavelengths), a triggering system, and the illumination module (high intensity LEDs). FIG. 1 presents different view-points for the concept design of the disclosed system, in particular, the physical layout of the entire system.

The disclosed imaging system and method are particularly advantageous for obtaining underwater texture data, as combining both structured-light and spatially non-coherent light, while filtering out closer-than-target incoming light, allows full texture reconstitution of larger and smaller 3D features, while avoiding unnecessary short-distance backscatter particle noise which impairs for said texture retrieval.

All components are preferably interconnected with software modules that extract the 3D information from visual data. The architecture implemented in the disclosed system according to an embodiment is depicted in FIG. 2. Outputs of the system according to an embodiment comprise a pair of images from the PS, point clouds retrieved by each 3D imaging technique (4 point clouds from the LSR and a dense point cloud from the PS). These point clouds can be combined further by applying 3D filtering techniques It is disclosed a hybrid imaging system for 3D imaging of an underwater target, comprising:

two optical image sensors for stereoscopic imaging of the target;

a switchable structured-light emitter having different wavelengths for illuminating the target;

a switchable spatially non-coherent light source for illuminating the target;

a data processor connected to the image sensors, structured-light emitter and spatially non-coherent light source, configured for alternating between operating modes which comprise:

a first mode wherein the structured-light emitter is activated, the spatially non-coherent light source is deactivated and the image sensors are activated to capture reflected light from the structured-light emitter, and a second mode wherein the structured-light emitter is deactivated, the spatially non-coherent light source is activated and the image sensors are activated to capture reflected light from the light source;

wherein the data processor is configured for delaying image sensor capture, on the activation of the structured-light emitter and on the activation of the spatially non-coherent light source, for a predetermined amount of time such that light reflected from points closer than the target is not captured.

It is also disclosed a hybrid imaging system for 3D imaging of an underwater target by alternating structured-light and spatially non-coherent light, comprising:

two optical image sensors for stereoscopic imaging of the target;

a switchable structured-light emitter having different wavelengths for illuminating the target;

a switchable spatially non-coherent light source for illuminating the target;

a data processor connected to the image sensors, structured-light emitter and spatially non-coherent light source, wherein the data processor is configured for delaying image sensor capture, on the activation of the structured-light emitter and on the activation of the spatially non-coherent light source, for a predetermined amount of time such that first light reflected from points closer than the target is not captured.

In an embodiment, the data processor is configured for alternating between operating modes which comprise:

a first mode wherein the structured-light emitter is activated, the spatially non-coherent light source is deactivated and the image sensors are activated to capture reflected light from the structured-light emitter, and a second mode wherein the structured-light emitter is deactivated, the spatially non-coherent light source is activated and the image sensors are activated to capture reflected light from the light source.

Both capturing structured light and stereoscopic images benefits from having switched lighting, because by using the time of travel of light as light begins its course, after being switched on, one can exclude the first light reflected back to image sensors. This way, one can remove the mostly backscattered light from underwater turbidity, which is reflected back to the image sensor from the proximity of the sensor. This improves the quality of the image remarkably.

When using switched lighting, more powerful light sources and emitters are normally used. Commonly speaking, the effect can be similar to a photographic flash repetition, wherein short bursts of intense light are emitted quickly and repeatedly.

Thus, by having switched lighting, it should be ensured that the structured light (normally, an intense laser light) does not obfuscate the image sensors during image capture of the lighting by common light—loosing image sharpness. The sharpness of the captured images is important for stereoscopic computer vision analysis of the common lighting images.

Conversely, it should also be ensured that the lighting by common light does not impair the image sensors during image capture of the lighting by structured-light—laser lighting is not so effective against darker surfaces and the broad common light will remove contrast from the captured images. This contrast is important for 3D computer vision analysis of the structured lighting images.

In an embodiment, a data processor is further configured for processing both captured structured-light images and light source images to obtain merged 3D imaging data. In an embodiment, the data processor is configured to, previous to said processing, to extract 3D data from the captured structured-light images and from the captured light source images. In an embodiment, the data processor is configured to extract 3D data from the captured light source images by rectifying the captured images according to a pre-calibration, by estimating spatial disparity between the captured images from the two image sensors, and by calculating a 3D point cloud from the estimated spatial disparity. In an embodiment, the data processor is configured to extract 3D data from the captured structured-light images by correcting for distortion according to a pre-calibration, by triangulating the 3D locations of the reflected structured-light, and by calculating a 3D point cloud from the triangulated 3D locations.

In an embodiment, said merger of 3D data is carried out periodically and with a frequency of at least 1 Hz, preferably of at least 10 Hz, more preferably of at least 30 Hz, more preferably of at least 60 Hz, more preferably of at least 100 Hz. By periodically combining the 3D merged data obtained between structured-light and spatially non-coherent light, the underwater vehicle can avoid obstacles in real-time. Also, a robotic underwater manipulator can use in real-time the merged 3D texture data obtained between structured-light and spatially non-coherent light. For example, surfaces covered in biofilm or rusty surfaces have specific 3D textures; information that a robotic arm can make use of in real-time.

An embodiment is further configured for segmenting the reflected structured-light in the captured structured-light images by using color space, in particular the YcrCb color space.

In an embodiment, the 3D imaging data comprises 3D texture data. In an embodiment, the data processor is configured to maintain the structured-light emitter activated during image sensor exposure time for capturing the reflected light from the structured-light emitter. In an embodiment, the data processor is configured to maintain the light source activated during image sensor exposure time for capturing the reflected light from the light source.

By having the light remaining switched on during substantially all the exposure period of the cameras, this increases the accuracy of the 3D imaging, reduces the power consumption of the system and enables higher speed acquisitions.

An embodiment comprises additional optical image sensors for 3D imaging of the target. Additional image sensors are useful for improving the image capture in particular the 3D resolution.

In an embodiment, the structured light emitter is a dual laser stripe. In an embodiment, the laser stripe is substantially parallel to a movement path of the imaging system. In an embodiment, the two lasers have a different wavelength. In an embodiment, the structured light emitter comprises a red laser stripe and a green laser stripe. A laser stripe is advantageous for underwater use, especially when used along a movement path.

In an embodiment, the light source comprises LEDs. In an embodiment, the light source is substantially isotropic in illumination of said target. LEDs are efficient light sources suitable for flooding a considerable area with spatially non-coherent light.

In an embodiment, the optical image sensors are cameras. Cameras are efficient cost-effective image sensors and are able to capture both reflected light from the structured-light emitter and reflected light from a common spatially non-coherent light source.

The hybrid imaging approach disclosed brings together active and passive imaging principles: multiple Light Stripe Range (LSR) and a Photometric Stereo (PS) technique.

The LSR is an active technique that comprises a set of stripes of light generated by laser diodes that are projected in the scene. The 3D information is recovered from these laser stripes by means of triangulation. Laser technology has a strong advantage in underwater scenes since emitters concentrate an intense light over a very narrow area which makes the light to propagate longer distances.

The segmentation of the laser stripe can be conducted in the YCrCb because this space is more photometric invariant to light changes and the chroma components of this space are less intercorrelated. Then, a straight-forward segmentation procedure takes into consideration the chroma values (Cr and Cb) and confidence intervals. Afterwards, the preliminary segmentation results are redefined by a watershed approach that groups pixels with similar spatial position and color. Morphological operators increase the spatial connectivity of the segmentation result.

Before extracting the 3D information, a calibration must be performed to estimate the spatial arrangement of each laser according to the camera frame. Thus, the triangulation determines the three-dimensional points by intercepting 2D points (image plane because the camera matrix is known) from the segmentation with the plane equations available, see equations 3 to 5:

$$Z = -\left(\frac{a*x + b*y + d}{c}\right) \quad (3)$$

$$X = Z*x \quad (4)$$

$$Y = Z*y \quad (5)$$

where x and y are the 2D points described in the image plane and, the a; b; c and d define a plane that characterizes the laser-camera setup. The X; Y and Z are 3D coordinates of a point represented in the camera frame. This triangulation process is repeated for each pair camera-laser.

The biggest advantage of an active imaging approach is the high accuracy and robustness of data that can be retrieved from the scene. Usually, the propagation of light in water is seriously compromised by the scatter and absorption of light caused by the medium which reduce the image contrast and intensity [1]. The LSR calculates distances and object sizes with a high degree of precision, minimizes the backscatter and increases the image contrast.

The PS is a passive technique that reconstructs the 3D surfaces based on different viewpoints. It provides point clouds having a high density of 3D data when compared to LSR. The knowledge of the relative position and orientation of both cameras (separated by a rigid baseline) makes possible the extraction of the three-dimensional surface through the stereoscopy principle: 3D points generated by 2D point pairs. Conventional stereo vision could be performed in two distinct ways namely, sparse (a set of point pairs) or dense (for every pixel). Both ways can be used in the disclosed system, depending on the application. A key element of the PS module is the estimation of the disparity of images acquired in different viewpoints. This is often called as the correspondence problem (the challenge of associating 2D point pairs). The perception of depth arises from disparity by means of triangulation (depth is inversely proportional to disparity). The set of 3D points (also known as a point cloud) can be more or less dense depending on the amount of valid stereo correspondences. In practice, the PS module is suitable for environments having dynamic elements because it provides data that is richer in 3D information.

The algorithm 2 presents high-level procedures for extracting 3D information based on a stereo rig. The implementation is straightforward in computer vision: the calibration of the stereo rig should is conducted in aerial and underwater scenarios, the disparity estimation follows [6], and 2D points with no disparity must be removed.

Algorithm 2 PS module: Extraction of 3D data from 2D point pairs.

load_StereoRig_Setup();  ▷ Spatial conf.
procedure EVENT_INCOME_IMAGES()
  $I_t^{left}, I_t^{right}$ = rectify_Images($I_t^{left}, I_t^{right}$);
  disparity = calculate_Disparity($I_t^{left}, I_t^{right}$);
  ptcloud = 3D_Reconstruction(disparity);
  PointCloud_RGBXYZ = remove_Invalid_3D_Points(ptcloud);
return PointCloud_RGBXYZ  ▷ Dense_Pointcloud & $I_t^{left}$ The disclosed imaging system also has the ability to control the formation of image in both cameras (e.g., the starting instant and duration). The range-gated imaging concept lays on the principle that the reflected light source pulsed from the LEDs or lasers is accumulated by an optical sensor and over a specified time, i.e., the camera shutter only opens after a short period of time. Thus, the camera sensor receives the light reflected from the object and blocks the back-scattered photons. The exposure time selects the depth range where the light reflected is perceived at the sensor location. This approach is one of the most effective optical solution for visual perception in turbid waters since it increases the image contrast by reducing the backscattering component.

The backscattering component affects the underwater imaging sensors: a fraction of light that passes through water is scattered back to the camera before reaching the target. Conventional optical systems are severely affected by $E_b$, which is mainly caused by particles suspended along the water column. These particles increase the water turbidity, and reduce both the visibility and the measurement range of optical systems. In this context, the range-gated feature available on the disclosed imaging system delays the image acquisition in a short period of time after the scene be illuminated by a light source: the artificial illumination module or the laser light from the LSR. An active-illumination functionality is implemented based on high intensity LEDs (light emitting diodes) to create a close-to-isotropic light source to illuminate the underwater scenario when the system is operating in total darkness. This active-illumination light is crucial at deeper environments because several light sources produce an uniform illuminated area which enhances the texture content of data perceived by the sensor.

The disclosed imaging system generates several triggering signals ($PS_{Trig}$ and $LSR_{Trig}$) that are sent to cameras with external triggering to control: the $PS_{Trig}$ activates the artificial illumination and the PS modules, and the signal $LSR_{Trig}$ activates the LSR module. These periodic signals are generated by an external trigger control unit called Range-Gated Synchronizer whose main objective is to ensure that images are acquired in the correct instant of time. Triggering signals $PS_{Trig}$ and $LSR_{Trig}$ are only sent to cameras with after a delay period of $T_{start}$ of these signals were received by the LSR and the active-illumination unit.

In this context, the camera shutter waits for the time that light takes to propagate from the emitter to the target. Ideally, $T_{start}$ is controlled according to the distance and the exposure time should be adjusted relatively to the $T_{stop}$-$T_{start}$. The goal of this approach is to reduce the amount of backscattering component that is perceived by the optical sensors which is mainly caused by suspended particles close to the observer. Therefore, the disclosed imaging system incorporates a range-gated feature that synchronizes the acquisition of image with sub-sea phenomena. The gated timing approach limits the exposure time of the optical system to the returning time of a light pulse (laser or LED) scattered by the target at a defined distance. A practical advantage of this range-gated approach relates with the robustness of the optical system to other sources of light or external interferences (exposure time versus the diaphragm's aperture). Although the influence of $E_b$ can be reduced by a range-gated approach (synchronization of the light source and camera), the $E_f$ cannot be quantitatively reduced by this method since this component reaches the image detector approximately at the same time than $E_d$.

The data-driven formulation proposed in this research follows a time discrimination pattern to aggregate the 3D information generated by the LSR and PS approaches. In this way, each image captures the light returned from a single light pulse that could be driven by the LSR or by the PS module. In practice it means that, the optical components of the disclosed imaging system are sequentially gated by the LSR (without the active-illumination source) and by the PS (with the active-illumination source) to minimize the amount of backscattering light that reaches the optical sensors, as well as, to mitigate the motion blur that arrives when the system is installed on the AUV or ROV.

A data-driven scheme synchronizes the acquisition instant of multi-cameras based on distinct time events. These time events are represented by signals $PS_{Trig}$ and $LSR_{Trig}$, which control the camera exposure delayed by $T_{start}/2$. Signals describing the ON period of the active-illumination module or lasers anticipate (by $T_{start}/2$) the time events: LSR ON and PS ON. In this way, the light sources (LSR or active-illumination) remain ON during the exposure period of the multi-cameras which increases the accuracy (real-time) of the synchronization process, reduces the power consumption and enables high speed acquisitions.

Therefore, the disclosed imaging system follows a time discrimination pattern to create at least two operating modes: LSR ON and PS ON, see FIG. 7(b). Optical sensors are able to capture the laser and LED light in distinct time slots. The PS ON mode shows that the disclosed imaging system acquires images that are analyzed by the PS module: estimates the 3D surface of the scenario illuminated by the active-illumination module. Overall, this module artificially illuminates the scene based on a rapidly variation of light pulses (strobe) which has several advantages: it is more energy-efficient than continuously emitted light sources and reduces the motion blur. This solution is, therefore, suitable for autonomous vehicles. The LSR ON mode recovers the three-dimensional structure of the environment from multiple laser-camera triangulations, conducted in the LSR module. In this mode, the active-illumination module remains OFF to decrease the amount of external light interferences during the segmentation of the laser stripes.

In practice, the disclosed imaging system combines multiple laser-based range-gated imaging with a stereo-illuminated range-gated imaging system, in a watertight enclosure. High intensity LEDs (Light Emitting Diodes) forms the active illumination module that turns ON during the exposure period of cameras (in the PS ON mode). A set of pulse-gated laser stripes are processed by a LSR module (during the LSR ON mode) which extends the optimal range of the disclosed system to retrieve the three-dimensional characteristic of underwater scenarios. This gating timing scheme makes it possible to create images with high signal-to-noise ratio.

BRIEF DESCRIPTION OF THE DRAWINGS

The following figures provide preferred embodiments for illustrating the disclosure and should not be seen as limiting the scope of invention.

DETAILED DESCRIPTION

Figure 4A:
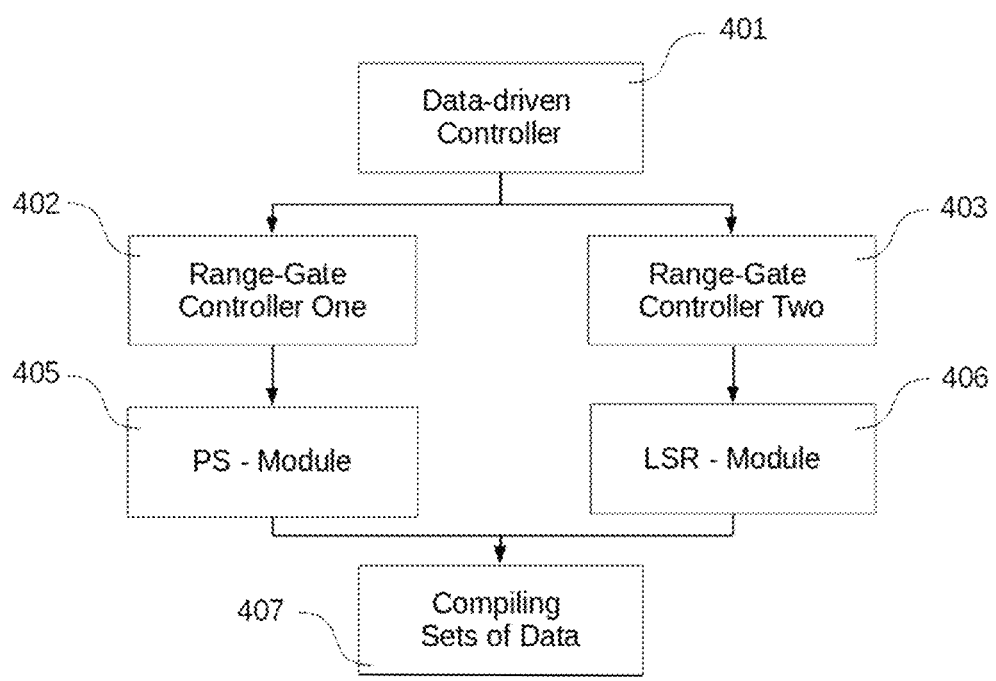
FIG. 4A: Schematic representation of the method of operation of an embodiment of the hybrid-based visual approach controlled by a range-gated imaging scheme with a data-driven formulation according to the disclosure.

The disclosure includes an advanced optical system 100 that combines a hybrid-based visual approach controlled by a range-gated imaging scheme with a data-driven formulation (FIG. 4a). The internal architecture of disclosed imaging system according to an embodiment is formed by three main modules: multiple Light Stripe Range (LSR) 406, Photometric Stereo (PS) 405 and Range-Gated Synchronizers 401, 402 and 403.

Figure 4B:
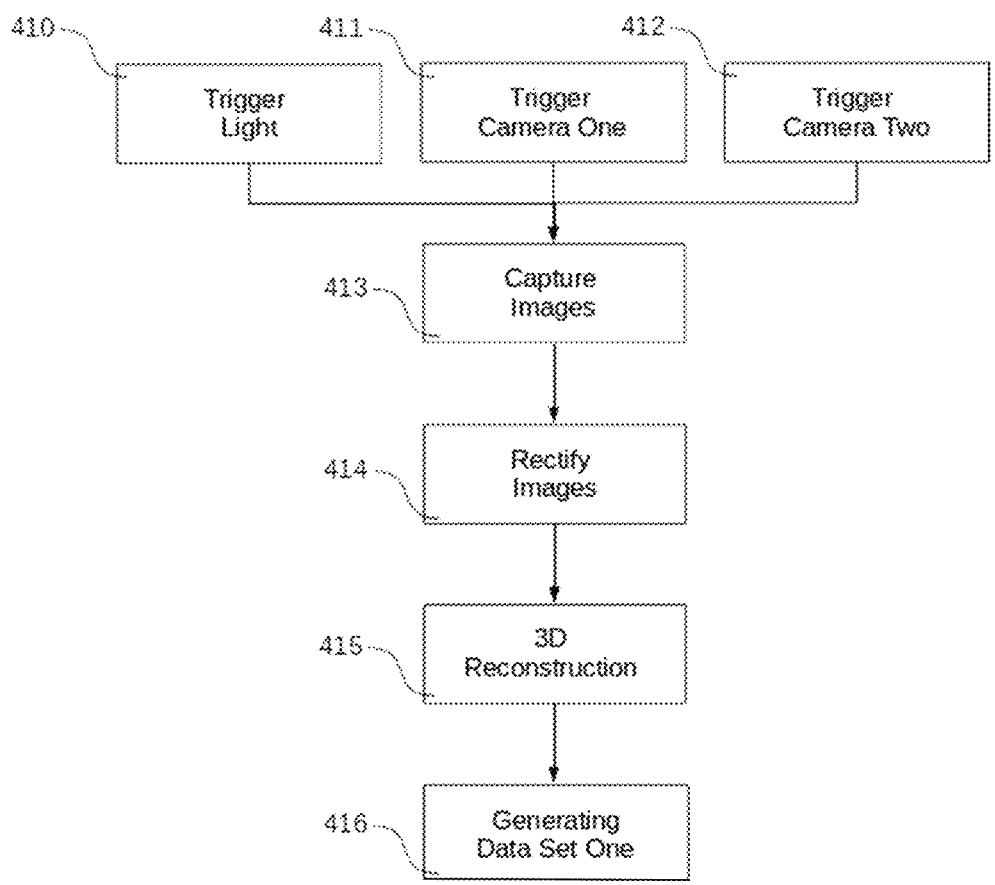
FIG. 4B: Schematic representation of the method of operation of an embodiment of the time discrimination pattern for the Photometric Stereo (PS) mode, according to the disclosure.

A data-driven scheme 401 controls the acquisition process of multi-optical sensors based on distinct time events. The disclosed imaging system follows a time discrimination pattern to create two (or more) operating modes: LSR (FIG. 4c) and PS (FIG. 4b). The optical sensors (101 and 102) are able to capture the laser stripes (108a and 108b) and LED light (from 107) in distinct time slots.

The 3D information sent by the LSR 406 and the PS 405 modules is filtered in a fourth module 407 that combines the 3D points generated by a LSR and PS.

The hardware of the disclosed imaging system 100 according to an embodiment is formed by two cameras (left 101 and right 102), two laser stripes sensors (103 and 104 with different wavelengths), a processing unit 106, a triggering system 105, and the illumination module (high intensity LEDs) 107.

The triggering system 105 is controlled according to an embodiment at the highest level by the Data-driven Controller 401 that is running on a processing unit 106. The generation of physical signals by 105 is directly achieved by the Range-Gated Controller One 402 and the Range-Gated Controller Two 403.

The triggering system 105 send some physical triggering signals 410, 411 and 412 that are synchronized by the Range-Gated Controller Two 403 and, the signals 411, 412, 417 and 418 that are synchronized by the Range-Gated Controller One 402.

The range-gated feature 402 and 403 delays the image acquisition in a short period of time after the scene be illuminated by a light source: the artificial illumination module 107 or the laser stripe light 108a and 108b from the LSR. Each camera shutter waits for the time that light takes to propagate from the emitter (103, 104 or 107) to the target (110) and back. This delay time (Tstart) is controlled according to a function that considers light velocity in water and the distance between the imaging system to the target. The exposure time is adjusted relatively to the maximum distance allowed.

Figure 4C:
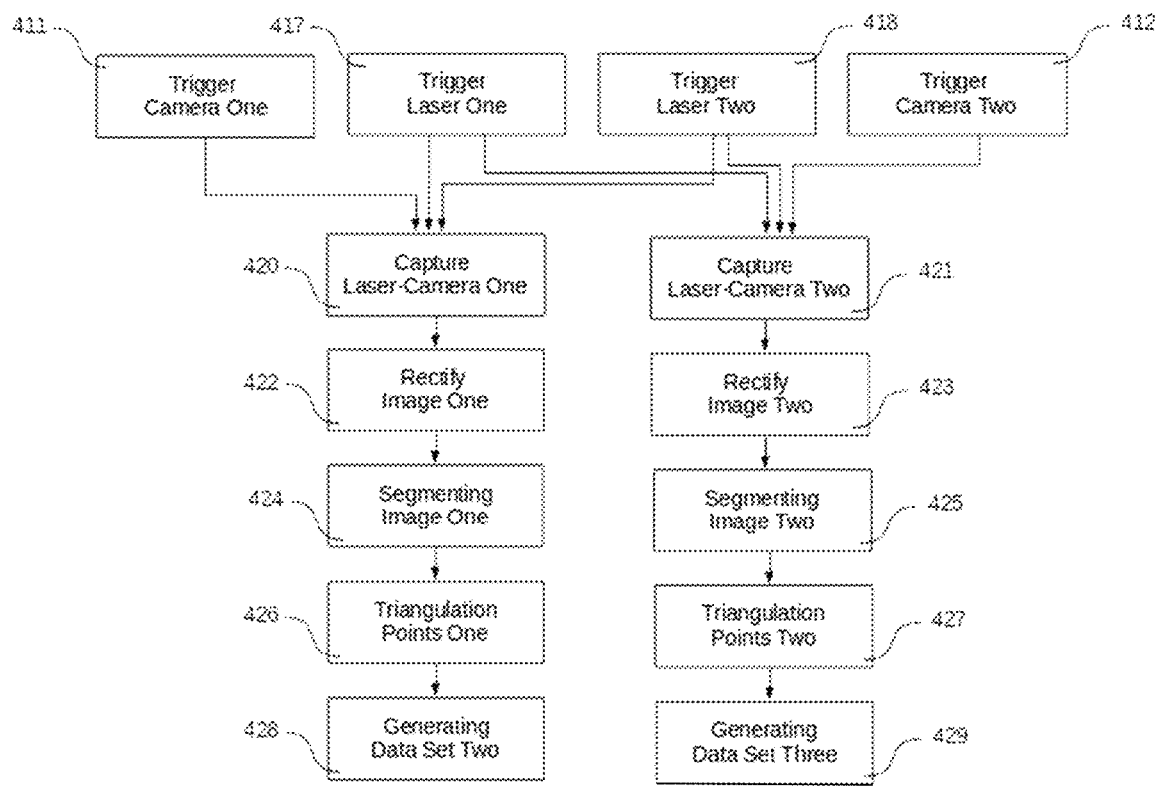
FIG. 4C: Schematic representation of the method of operation of an embodiment of the time discrimination pattern for the Light Stripe Range (LSR) mode, according to the disclosure.

FIGS. 4A to 4C demonstrate that the disclosed imaging system has the ability to control the formation of image 413, 420 and 421 in each optical sensor (Camera One 101 and Camera Two 102), e.g., the starting instant and duration.

The range-gated feature 402 and 403 reduces the amount of backscattering component that is perceived by optical sensors which is mainly caused by suspended particles close to the observer.

The light sources (from the LSR 406 and PS 405) remain ON during the exposure period of Cameras (101 and 102) which increases the accuracy of the 3D point cloud (407), reduces the power consumption of the disclosed imaging system and enables high speed acquisitions.

All the hardware is interconnected with software modules described in FIG. 4A, FIG. 4B and FIG. 4C which extract the 3D information from the visual data (428 and 429 for the LSR and 416 for the PS module) and run on a processing unit 106.

The PS module 405 is suitable for environments having dynamic elements because it provides data that is denser in terms of 3D information. The algorithm of FIG. 4B presents high-level procedures for extracting 3D information based on a stereo rig (cameras 101 and 102 with artificial illumination 107).

An active-illumination functionality is implemented based on high intensity LEDs (light emitting diodes) 107 to create a close-to-isotropic light source (spatially non-coherent) to illuminate the underwater scenario (eg., 110) when the system is operating in total darkness, in particular, the PS module (to enhance the texture information acquired by both cameras in 413).

The algorithm 405 starts with the triggering signals from the hardware (that is controlled by the Range-Gate Controller One 402): artificial illumination 410 and both cameras 411 and 412. These triggering signals (410, 411 and 412) lead to image formation in 413, whose images are rectified 414 according to a previous calibration of the stereo rig setup (Camera One and Two, 101 and 102 respectively). After that, the disparity of this pair of images is estimated and the 3D point cloud is generated 415. Invalid and incoherent 3D points are removed from the point cloud 416.

The LSR module 406 is a structured light emitter comprising an active technique that comprises a set of stripes of light generated by laser diodes 103 and 104 that are projected in the scene. Laser technology has a strong advantage in underwater scenes since emitters 103 and 104 concentrate an intense light over a very narrow area which makes the light to propagate longer distances. The 3D information is recovered from these laser stripes 108a and 108b by means of triangulation.

The algorithm 406 starts with the triggering signals from the hardware (that is controlled by the Range-Gate Controller Two 403): both cameras 411 and 412 and both laser stripes sensors 417 and 418. These triggering signals (411, 412, 417 and 418) lead to an image formation in Camera One in 420, and to an image formation in Camera Two in 421.

Distortion of the lens and the influence of the housing is corrected for both images in 422 and 423. The segmentation of the laser stripe in each image 424 and 425 is conducted in the YcrCb color space because this space is more photometric invariant to light changes and the chroma components of this space are less intercorrelated. Segmentation results are further redefined by a watershed approach that groups pixels with similar spatial position and color.

Before extracting the 3D information from the 2D segmentation results, a calibration must be performed to estimate the spatial arrangement of each laser according to the camera frame. Thus, the triangulation 426 and 427 determines the three-dimensional points for both camera's perspectives 428 and 429.

In particular, the following features are disclosed in the drawings: 100—Hardware; 101—Left Camera (or Camera One); 102—Right Camera (or Camera Two); 103—Left Laser (or Laser One); 104—Right Laser (or Laser Two); 105—Range-Gated controller unit; 106—Processing Unit; 107—Active-illumination module; 108a—Stripe of light generated by Laser One; 108b—Stripe of light generated by Laser Two; 109a—Cameras supporting structure; 109a—Lasers supporting structure; 110—Example of a possible Target/Object.

One of the biggest advantages of the disclosed imaging system is the high accuracy and robustness of data that can be retrieved from the scene. Usually, the propagation of light in water is seriously compromised by the scatter and absorption of light caused by the medium which reduce the image contrast and intensity. The LSR calculates distances and object sizes with a high degree of precision, minimizes the backscatter and increases the image contrast. At the same time, the PS estimates a point cloud that is less accurate than LSR however, it is significantly denser in measures. Both data are combined in 407 which provides the best advantages of two imaging techniques.

In order to validate the disclosure, a comprehensive set of experiments were conducted to assess how the perceptual losses caused by water turbidity have impact on the visual response of the disclosed imaging system. Laboratory tests have been conducted in a water tank (0.94×0.54×0.52 m) initially filled with clear water (264 litres). The turbidity of the water was controlled by dissolving different quantities of gray mortar to create distinct scattering conditions.

The perceptual quality of the disclosed imaging system achieved a SSIM index above 0.655 for waters having a high concentration of suspended material while, at the same time, a conventional system obtained a value of 0.328. The maximum absolute mean errors of the disclosed imaging system were lower than 0.001 m for X and Y-axis and 0.006 m for Z-axis. On the other hand, the absolute mean errors of conventional passive imaging technique (CPIS) were close to 0.002, 0.001 and 0.013 m for the X, Y and Z-axis. The maximum absolute error of PS-module was about 0.035 m and the average error was less than 0.025 m. The results of the LSR-module (a 50 milliwatt laser stripe with red wavelength) demonstrate that the maximum absolute error was round 0.020 m and the average absolute error was about 0.010 m.

An important feature of this analysis is that, the accuracy does not appear to be affected by the water turbidity which means that the major impact of the testing conditions is on the precision of the 3D reconstructions. Therefore, these results demonstrated an unambiguous enhancement of the precision of the disclosed imaging system when compared to CPIS for operations requiring the three-dimensional reconstruction of objects in underwater environments.

Overall, this section analyses the performance features of the proposed system and discusses the advantages comparatively to a conventional passive imaging system (CPIS). A comprehensive set of experiments were conducted as part of this work to assess how the perceptual losses caused by water turbidity have impact on the visual response of the disclosed system. Therefore, the visual quality (in section 4.2) and the capacity to retrieve the 3D information (in section 4.3) are discussed according to several testing conditions, in particular, distinct objects and different concentration levels of suspense matter in water. Experiments were focused on the PS-module of the disclosed system since, theoretically, it is more affected by the water turbidity.

First experiments provide a reliable study of photometric phenomena that affect underwater imaging (mainly, the backscattering component). They aim to characterize the perceptual quality of the disclosed system and compare it to a CPIS. A quantitative assessment is conducted using several objective metrics, namely, the root-mean square error (RMSE), the peak signal-to-noise ratio (PSNR) and the structural similarity (SSIM). The perceptual quality assessment is mainly obtained through the structural similarity (SSIM) metric since the SNR and PSNR have physical meanings but they are not suitable to perceive the visual quality [19]. Second experiments show the three-dimensional reconstruction of objects as a function of the water turbidity. Quantitative evaluations are supported by the absolute mean error of point clouds generated by the disclosed system which are also compared to a conventional passive imaging system (CPIS). A total number of 30 points clouds obtained for each testing condition make possible to specify the average error and standard deviation of measurements along each coordinate axis (X, Y and Z). Several objects are considered during these trials. Finally, the third experiments aim to study the accuracy of the disclosed system, in particular, the LSR and the PS modules. This is particularly relevant for an optical system that is designed for precise and accurate underwater operations.

Laboratory tests have been conducted in a water tank (0.94 0.54 0.52 m) initially filled with clear water (264 litres). The turbidity of the water was controlled by dissolving different quantities of gray mortar to create distinct scattering conditions, similar to the ones that are usually found during close-range operations in real marine environments. The material remains suspended in water for a time sufficient to conduct the experiments. All results were obtained with a Secchi disk and by varying the concentration level of gray mortar dissolved in water as presented in table 1: a baseline (0 mg/l), low concentration (37.8 mg/l), medium concentration (68.2 mg/l) and high concentration (90.9 mg/l), were achieved by dissolving 0 g, 10 g, 18 g and 24 g, respectively (the Secchi disk aims to facilitate the visual comparison between images acquired with distinct concentration levels of suspended matter).

TABLE 1

Characterization of the testing conditions (trials).

| Turbidity level | Material Dissolved (mg/l) | Illuminance (lx) |
|---|---|---|
| Baseline (clear water) | 0.0 | 95 |
| Low turbidity | 37.8 | 98 |
| Medium turbidity | 68.2 | 99 |
| High turbidity | 90.9 | 98 |

Moreover, tests have been conducted with four clay objects ranging from 0.13 to 0.20 m: V-object, OS-object, OC-object and T-object having a height of 0.16 m, 0.13 m, 0.19 m and 0.14 m, respectively.

Figure 1:
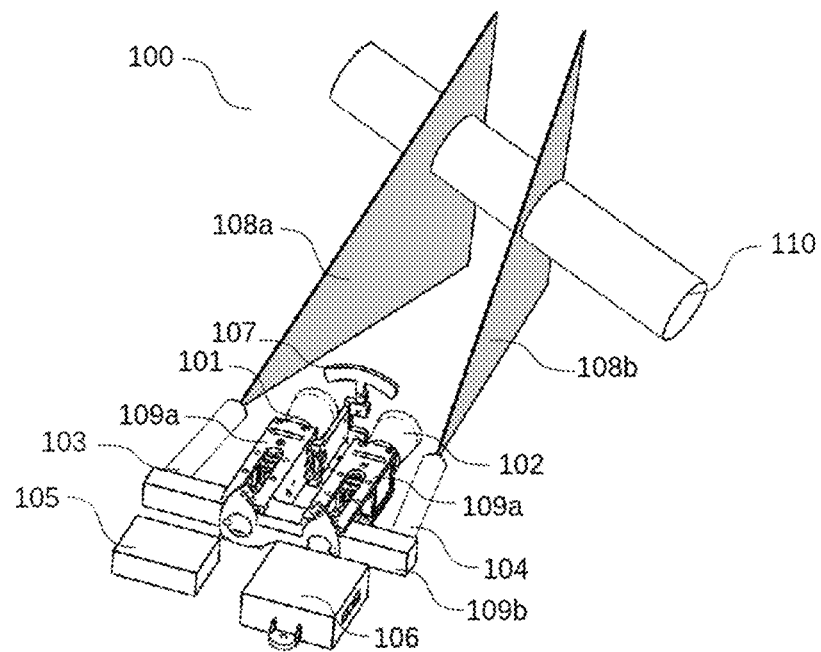
FIG. 1: Schematic representation of an embodiment of the hybrid imaging system according to the disclosure.
Figure 2:
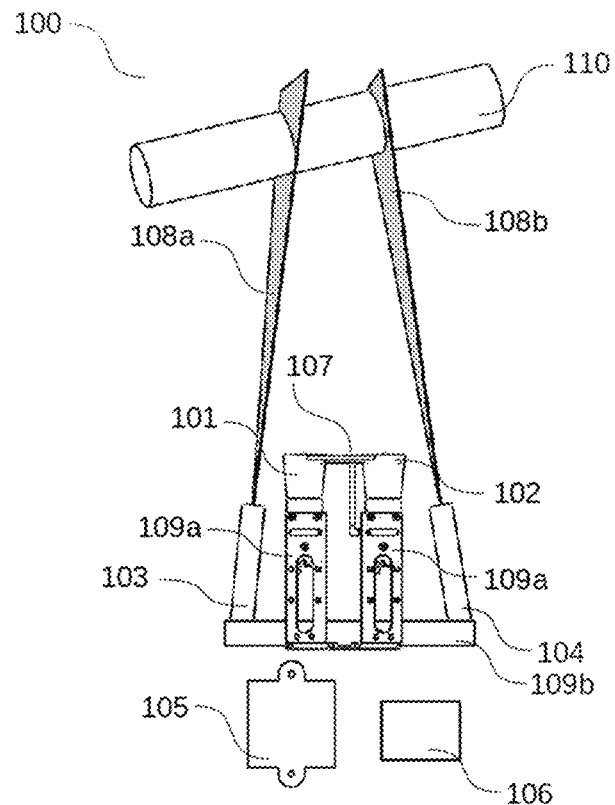
FIG. 2: Schematic representation of an embodiment of the hybrid imaging system according to the disclosure.
Figure 3:
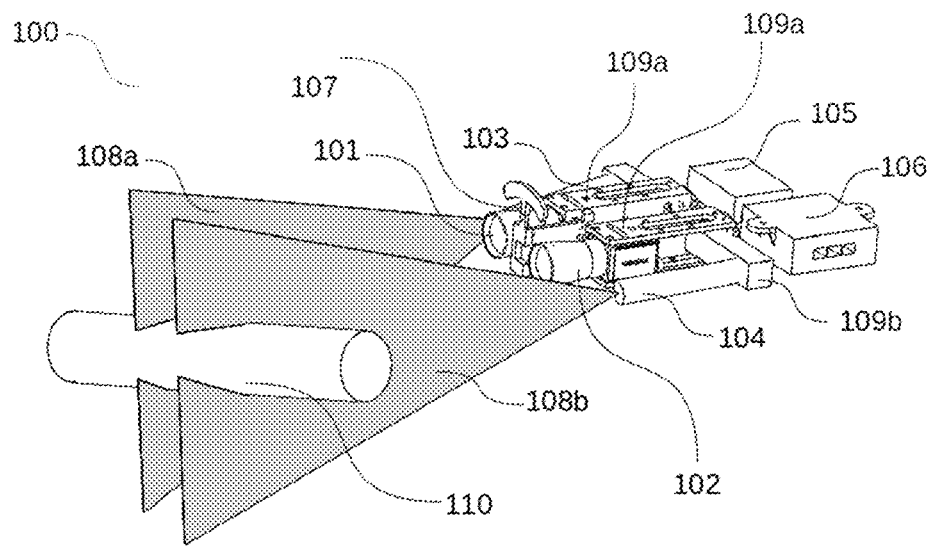
FIG. 3: Schematic representation of an embodiment of the hybrid imaging system according to the disclosure.

The results are contextualized in a realistic underwater environment to make possible a reliable and accurate evaluation of the responses of the pro-posed system. All results in this section were obtained with an exemplary embodiment having an i7-4700HQ CPU 2.40 GHz computer and without parallel programming or GPU. The vision software was implemented in C++ using the commonly used OpenCV library (3.1 version). Both the disclosed system and the CPIS share some similar hardware. The CPIS relies on a "Lumen Subsea Light—BlueRobotics", physically separated by 0.2 m from the acquisition system. This setup follows imaging solutions that are usually found in ROV/AUVs. The images have a resolution of 1280×960 and were captured from a stereo-rig composed by two "MAKO 125C—AlliedVision" cameras with a 6 mm focal lens. The calibration of both visual systems was conducted in air and underwater following the global Levenberg-Marquardt optimization algorithm to minimize the re-projection error of points in a chessboard. Thus, the effectiveness of the calibration procedure was controlled by the re-projection error where in both cases was less than half of pixel. The refraction at the water-air interface causes a reduction of the field-of-view because the imaging system housing on FIG. 3 mounts at port.

The perceptual quality of the disclosed system is evaluated in this section. Four testing scenarios with different objects were used. Testing involved checking to what extent images captured by this system are affected by the concentration level of suspended matter because their contrast is reduced.

The quality of images acquired by the disclosed system and CPIS are compared during the trials/conditions presented in table 2. The objective metrics, namely, RMSE, SNR, PSNR and SSIM quantify the degradation of the visual quality suffered by the disclosed system, according to distinct testing conditions (baseline, low, medium and high turbidity level). These metrics are estimated relatively to aerial trials that were obtained for benchmarking. A region of interest formed only by the foreground surface of objects was specified for the determination of the RMSE, SNR, PSNR and SSIM values. Each region of interest was compared to the aerial trial. In this way, the visual losses caused by the underwater scenario can be established for different concentration levels of gray mortar, see table 2.

Figure 5A:
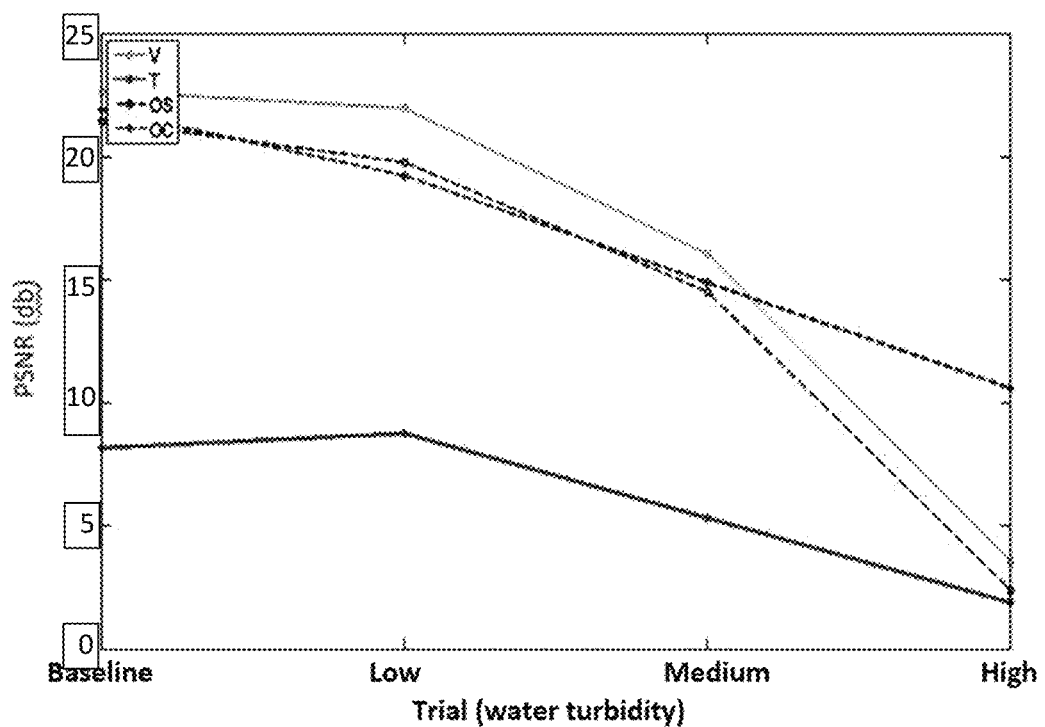
FIGS. 5A and 5B: graphical representations of the performance evolution of the disclosed system using the PSNR and SSIM assessment metrics for different turbidity conditions.
Figure 5B:
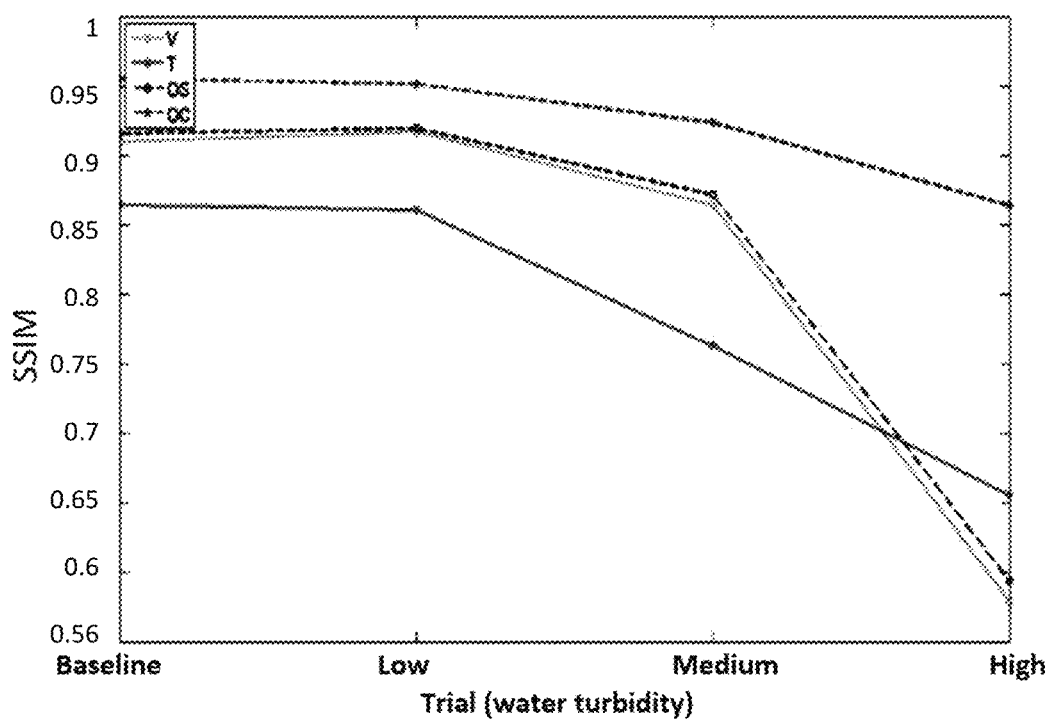
Figure 6A:
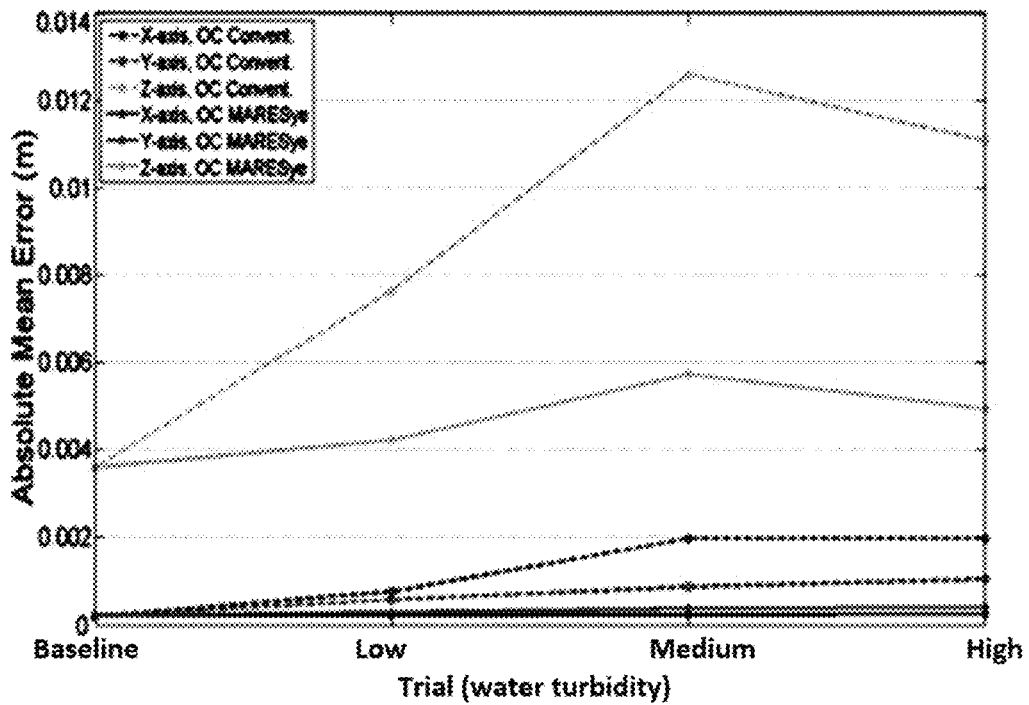
FIGS. 6A and 6B: graphical representations of the evolution of the absolute mean error (figure 15(a)) and respective standard deviation (figure 15b)) for the disclosed system (solid-lines) and the CPIS (dashed-lines), for different turbidity conditions. The results were obtained for the OC-object.
Figure 6B:
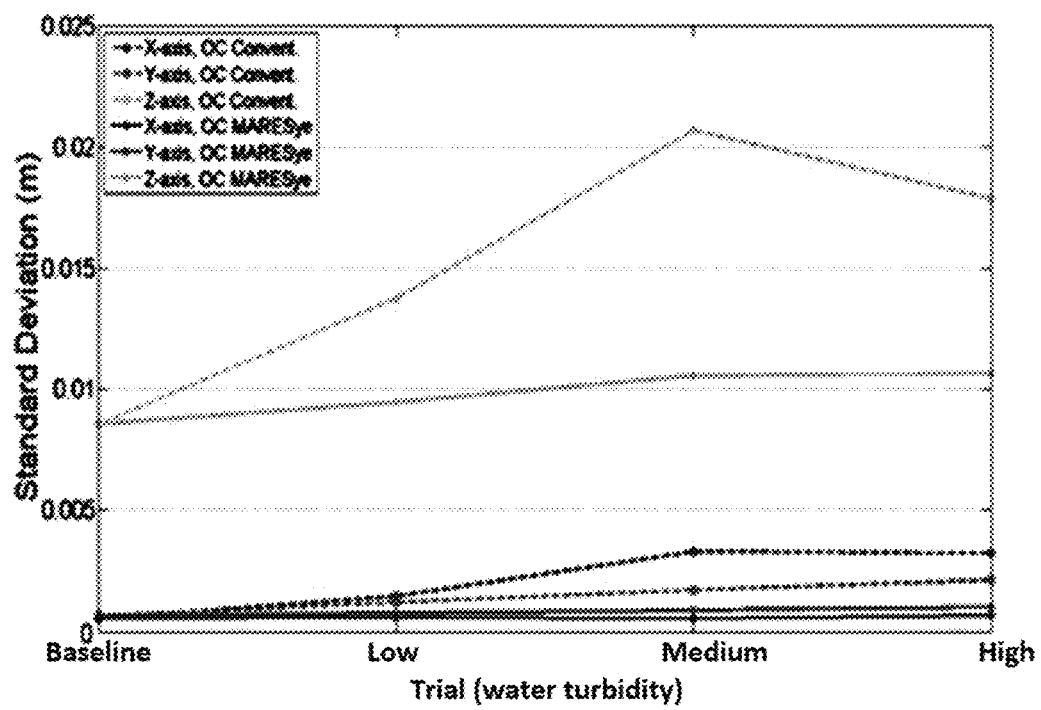
Figure 7A:
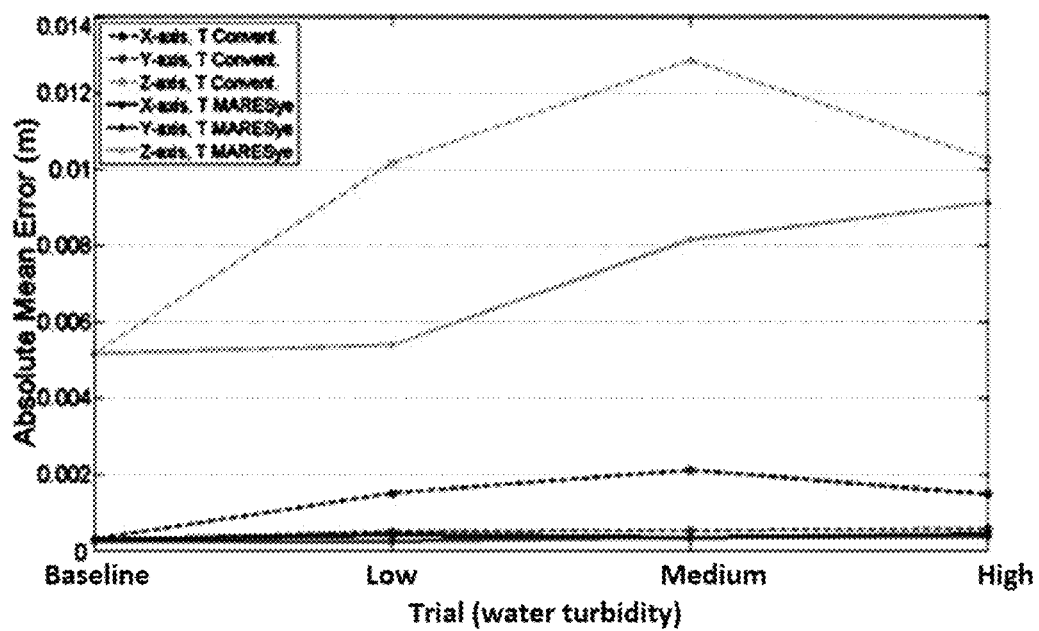
FIGS. 7A and 7B: graphical representations of the evolution of the absolute mean error (figure 15a)) and respective standard deviation (figure 15(b)) for the disclosed system (solid-lines) and the CPIS (dashed-lines), for different turbidity conditions. The results were obtained for the T-object.
Figure 7B:
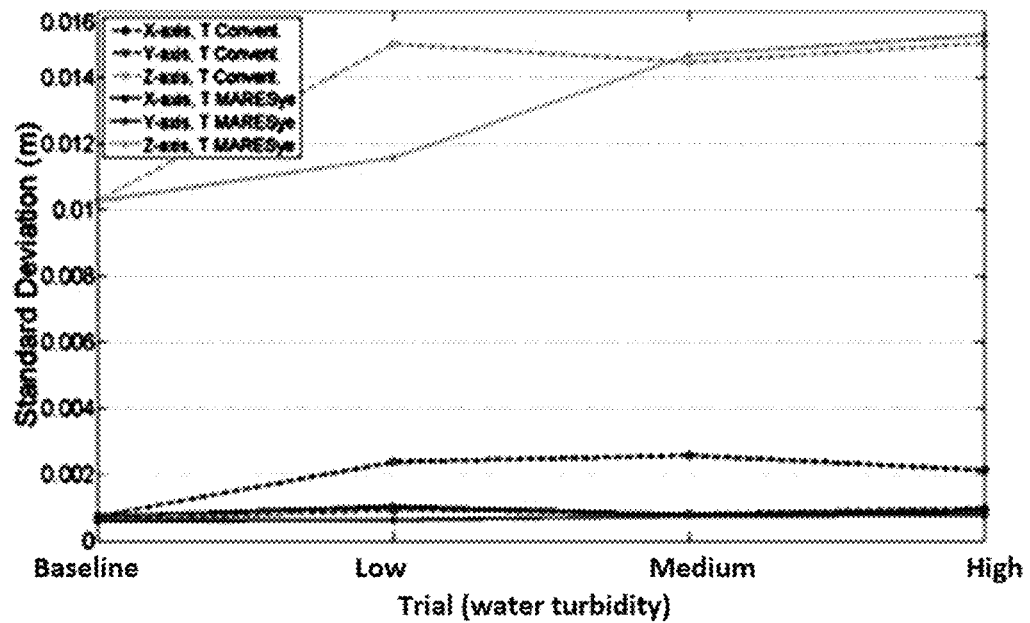

FIG. 5A and FIG. 5B present the performance of the disclosed system for all testing conditions and considering the PSNR and SSIM metrics, respectively. The curves of both metrics follow a similar pattern whose differences are caused by the clarity of objects. This fact can be noticed by comparing the decay ratio of trials with the T-object versus the V-object: the visual quality of trials with T-object was reduced after the testing conditions with low turbidity. However, the visual quality of other objects was substantially reduced after the medium turbidity trials. Therefore, images capturing darker objects (T-object) accelerate the perceptual quality loss since they have lower contrast.

As expected, increasing the concentration level of gray mortar increases the water turbidity which directly affects the quality of image perceived by the proposed system. The disclosed system demonstrates a good response in terms of visual quality for baseline/medium turbidity trials since the maximum decay values were 7 dB for PNSR and 0.1 for SSIM. Only the high turbidity trials have originated a significant reduction of the image contrast and the texture information, by leading to a maximum decay value of 13 dB for PSNR and 0.28 for SSIM. Therefore, concentrations of suspended material in water above 90.09 mg/l will certainly lead to images with poor SNR but, even in those trials, the perceptual quality of the disclosed system was up to 11 dB and 0.86 for PSNR and SSIM, respectively. These results could be justified by the range-gated approach and the artificial illumination module since they make possible to obtain images with a good perceptual quality.

Table 2 compares the perceptual quality values obtained by the proposed system and CPIS, for the same testing conditions (table 1). Although sharing a similar performance during the baseline trials, the disclosed system and the CPIS have distinct evolutions when the water turbidity increases. In fact, the differences regarding the visual quality are up to 10 dB and 0.5 for PSNR and SSIM, respectively. Focusing on the two objects (T-object and OC-object): the images acquired by the disclosed system have demonstrated a higher perceptual quality for all trials evaluated in this disclosure and considering all the assessment metrics, for instance, the SNR values of CPIS were reduced from 3:45 and 16:80 dB to 12:68 and 7:11 dB while the values of the disclosed system (under the same conditions) were reduced to 2:81 and 5:59 dB for the T-object and OC-Object, respectively. Moreover, the average difference of the disclosed system and CPIS was about 0.388 and 0.360 for T-object and OC-object, considering the SSIM. Overall, the visual quality of the disclosed system is always higher than 0.6 for SSIM: from 0.95 to 0.87 in OC-object and 0.86 to 0.66 in T-object. Therefore, the PS-module of the disclosed system reduces the backscattering component when compared to a CPIS (that shares similar hardware and configuration).

TABLE 2

Comparison between the disclosed system and a CPIS, considering the RMSE, SNR, PSNR and SSIM assessment metrics for different turbidity conditions. The RMSE is represented in pixels and the SNR and PSNR are represented in decibels (dB).

| Metric | T-object/ System | Baseline | Low | Medium | High |
|---|---|---|---|---|---|
| RMSE | Conventional | 26.58 | 124.78 | 145.16 | 170.44 |
|  | Disclosure | — | 24.81 | 36.88 | 54.74 |
| SNR | Conventional | 3.45 | −9.97 | −11.28 | −12.68 |
|  | Disclosure | — | 4.05 | 0.61 | −2.81 |
| PSNR | Conventional | 8.15 | −5.27 | −6.58 | −7.98 |
|  | Disclosure | — | 8.75 | 5.31 | 1.88 |
| SSIM | Conventional | 0.864 | 0.370 | 0.414 | 0.328 |
|  | Disclosure | — | 0.860 | 0.762 | 0.655 |

| Metric | OC-object/ System | Baseline | Low | Medium | High |
|---|---|---|---|---|---|
| RMSE | Conventional | 9.57 | 131.13 | 136.37 | 150.38 |
|  | Disclosure | — | 13.015 | 21.46 | 35.22 |
| SNR | Conventional | 16.80 | −5.92 | −6.26 | −7.11 |
|  | Disclosure | — | 14.13 | 9.79 | 5.49 |
| PSNR | Conventional | 21.89 | −0.84 | −1.18 | −2.03 |
|  | Disclosure | — | 19.22 | 14.87 | 10.57 |
| SSIM | Conventional | 0.955 | 0.572 | 0.557 | 0.526 |
|  | Disclosure | — | 0.951 | 0.923 | 0.863 |

Results have demonstrated that the disclosed invention enhances the perceptual quality of images acquired in underwater environments, even when the imaging system is operating with a high concentration level of suspended matter in water. The disclosed system has the ability to provide 3D data from its visual acquisitions and, therefore, this section goes one step further and evaluates the impact that such innovations have during the three-dimensional reconstruction of objects. Qualitative evaluations about the precision and accuracy of the system are supported by quantitative metrics (absolute mean error) of the 3D reconstructions. In this article, the term "precision" relates to the statistical variability of data and the "accuracy" relates to the measurement error according to the ground truth.

Extracting 3D information from 2D point pairs (known by stereoscopy) depends on the algorithm that is used to solve this association problem. In this disclosure, the same algorithm sharing an identical parameterisation [6] was used to obtain the following results (E.g. parameterisation: size of the neighbourhood (5), minimum disparity (4), number of disparities (80), penalties on the disparity change (2400 and 600), speckle range (2) and speckle window (10)).

As expected, the field-of-view of the disclosed system diminished from the trials in air to water since a at port is required in the current housing of the disclosed system however, this limitation could be solved in future upgrades. Two major results appear from the analysis of point clouds obtained during the medium trials, when compared to the ones obtained during baseline (and, ultimately, to the aerial) trials: the precision and the density of points that are correctly estimated by the disclosed system are reduced by increasing the turbidity of water. High level contents of suspended matter augments the amount of light scattered in water which induces a noise component to the point clouds. This is mitigated but not completely eliminated by the imaging principles implemented in the disclosed system, for instance, the algorithm that calculates the stereo correspondence had more difficulty during the trials with medium concentration levels.

A total number of 30 samples of point clouds were retrieved for each trial using the disclosed system and a CPIS. A reference can be estimated (a point cloud) using these 30 samples and after segmenting the object's surface that is placed on the water tank. Based on this reference, it is possible to estimate the absolute error of each 3D point, as well as, the average and standard deviation along each axis. Thus, the precision of each system can be quantitatively studied using the absolute mean error and the standard deviation of measurements along each coordinate axis (X, Y and Z).

FIGS. 6A to 7A represent the absolute mean error of the 3D surface of the OC-object and T-object, respectively. As can be noticed, the disclosed system obtained lower errors. The maximum absolute mean errors were lower than 0.001 m for X and Y-axis and 0.006 m for Z-axis. On the other hand, the absolute mean errors of CPIS were close to 0.002, 0.001 and 0.013 m for the X, Y and Z-axis. FIGS. 6B and 7B show the standard deviation of the absolute mean errors for both objects (OC-object and T-object). The PS-module of the disclosed system show a small standard deviation for the majority of axes, with the exception of the Z-axis of T-object where the values of both imaging systems were close to 0.015 m (for the medium and high turbidity level). Therefore, these results demonstrated an unambiguous enhancement of the precision of the PS-module of the disclosed system when compared to CPIS for operations involving the three-dimensional reconstruction of objects in underwater environments. In fact, it was proved that a range-gated imaging scheme reduces the impact of the backscattering component and motion blur during the image formation and, as a consequence, make possible to estimate point clouds with better precision.

This section focuses on the evaluation of the accuracy of the disclosed system for the PS and LSR modules, see table 3. Results of the PS-module show measurements that were manually obtained through the point clouds. The real dimensions of all objects were compared to measures obtained by considering the Euclidean distance of 3D points that represent the height of each object. These results were also retrieved in different water conditions (from clear water to high turbidity). As can be noticed, the maximum absolute error was about 0.035 m and the average error was less than 0.025 m. An important feature of this analysis is that, the accuracy does not appear to be a affected by the water turbidity which means that the major impact of the testing conditions is on the precision of the 3D reconstructions.

The results of the LSR-module (a 50 milliwatt laser stripe with red wavelength) demonstrate that the maximum absolute error was round 0.020 m and the average absolute error was about 0.010 m. Two major results can be discussed from table 3: measurements conducted using the LSR data are more accurate (lower error than CPIS) and this imaging technique is robust to underwater environment.

Figure 8:
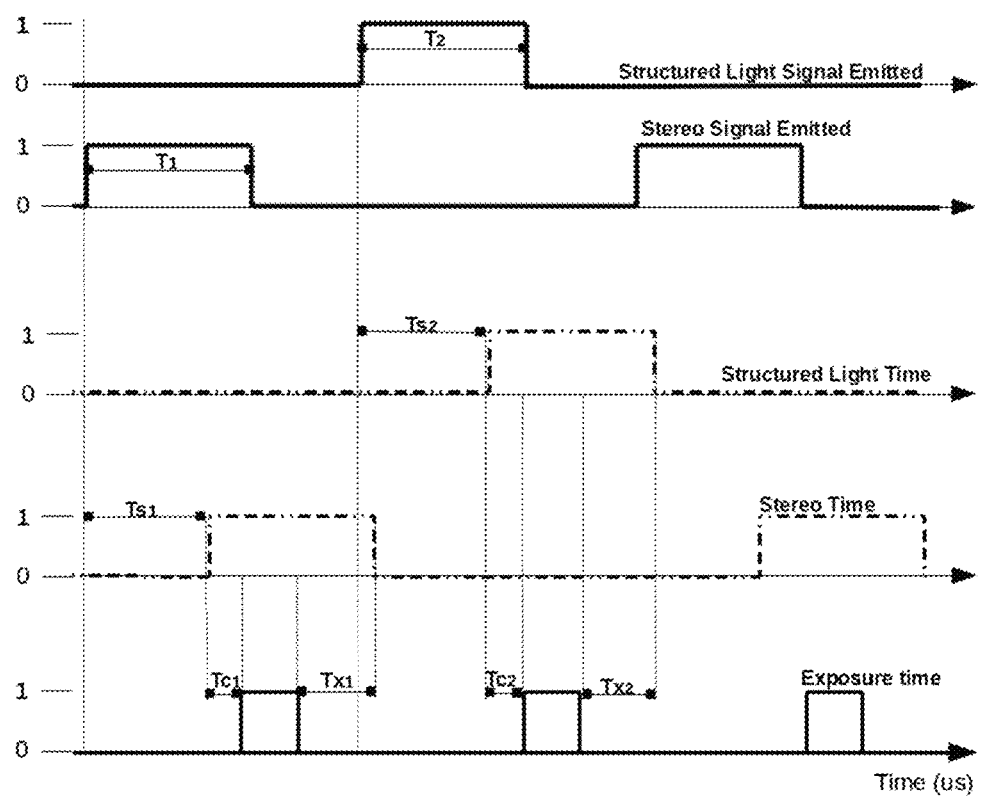
FIG. 8: graphical representations of the timing operation according to an embodiment of the hybrid imaging system according to the disclosure.

FIG. 8 shows an embodiment of timing operation according to the disclosure, wherein the switchable structured-light is emitted ($T_2$) and the spatially non-coherent light is emitted ($T_1$) during respective alternating time intervals. The delayed received structured-light (delay $T_{S2}$) and the spatially non-coherent light (delay $T_{S1}$) signals are represented during respective time intervals. The exposure is delayed (respectively $T_{C1}$ and $T_{C2}$) relative to the start of the respective light signal. Exposure is also stopped before the end of the respective light signal by a respective time interval ($T_{X1}$ and $T_{X2}$).

The disclosure should not be seen in any way restricted to the embodiments described and a person with ordinary skill in the art will foresee many possibilities to modifications thereof. The above described embodiments are combinable. The following claims further set out particular embodiments of the disclosure.

TABLE 3

Accuracy of the disclosure in different trials.

| Trial | Object | Measured by PS (m) | Error of PS (m) | Measured by LSR (m) | Error of LSR (m) |
|---|---|---|---|---|---|
| Baseline | T | 0.129 | 0.011 | 0.133 | 0.007 |
| | OC | 0.160 | 0.030 | 0.187 | 0.003 |
| | OS | 0.095 | 0.035 | 0.132 | 0.008 |
| | V | 0.143 | 0.017 | 0.176 | 0.016 |
| Low | T | 0.125 | 0.015 | 0.127 | 0.013 |
| | OC | 0.181 | 0.009 | 0.170 | 0.020 |
| | OS | 0.104 | 0.026 | 0.132 | 0.008 |
| | V | 0.150 | 0.010 | 0.175 | 0.015 |
| Medium | T | 0.122 | 0.018 | 0.128 | 0.012 |
| | OC | 0.168 | 0.022 | 0.175 | 0.015 |
| | OS | 0.100 | 0.030 | 0.131 | 0.001 |
| | V | 0.139 | 0.001 | 0.172 | 0.012 |
| High | T | 0.137 | 0.003 | 0.123 | 0.017 |
| | OC | 0.156 | 0.034 | 0.188 | 0.002 |
| | OS | 0.146 | 0.016 | 0.129 | 0.001 |
| | V | 0.159 | 0.019 | 0.169 | 0.009 |

The invention claimed is:

1. A hybrid imaging system for 3D imaging of an underwater target by alternating structured-light and spatially non-coherent light, comprising:
    two optical image sensors for stereoscopic imaging of the target;
    a switchable structured-light emitter having different wavelengths for illuminating the target;
    a switchable spatially non-coherent light source for illuminating the target; and
    a data processor connected to the image sensors, structured-light emitter and spatially non-coherent light source,
    wherein the data processor is further configured for processing both captured structured-light emitter images and spatially non-coherent light source images to obtain merged 3D imaging data of a surface of the target,
    wherein the merged 3D imaging data comprises 3D texture data, and
    wherein the data processor is configured for alternating between operating modes, the operating modes comprising:
        a first mode wherein the structured-light emitter is activated, the spatially non-coherent light source is deactivated, and the image sensors are activated to capture reflected light from the structured-light emitter; and
        a second mode wherein the structured-light emitter is deactivated, the spatially non-coherent light source is activated, and the image sensors are activated to capture reflected light from the spatially non-coherent light source.

2. The hybrid imaging system according to claim 1, wherein said merger of 3D data is carried out periodically and with a frequency of at least 1 Hz.

3. The hybrid imaging system according to claim 1, wherein the data processor is configured, previous to said processing, to extract 3D data from the captured structured-light images and to extract 3D data from the captured light source images.

4. The hybrid imaging system according to claim 2, wherein the data processor is configured to extract 3D data from the captured spatially non-coherent light source images by rectifying the captured images according to a pre-calibration, by estimating spatial disparity between the captured images from the two image sensors, and by calculating a 3D point cloud from the estimated spatial disparity.

5. The hybrid imaging system according to claim 1, wherein the data processor is configured to extract 3D data from the captured structured-light emitter images by correcting for distortion according to a pre-calibration, by triangulating the 3D locations of the reflected structured-light, and by calculating a 3D point cloud from the triangulated 3D locations.

6. The hybrid imaging system according to claim 5, further configured to segment the reflected structured-light in the captured structured-light images by using a color space.

7. The hybrid imaging system according to claim 1, wherein the structured light emitter comprises two lasers for emitting a dual laser stripe.

8. The hybrid imaging system according to claim 7, wherein the two lasers have a different wavelength.

9. The hybrid imaging system according to claim 1, wherein the spatially non-coherent light source is substantially isotropic in illumination of said target.

10. The hybrid imaging system according to claim 1, wherein the optical image sensors are configured for 3D imaging of the target.

11. The hybrid imaging system according to claim 1, wherein said predetermined amount of time is the time that light takes to propagate to the target and back.

12. The hybrid imaging system according to claim 1, wherein the data processor is further configured for exposure time of the image sensor capture to be adjusted relatively to the maximum distance allowed.

13. The hybrid imaging system according to claim 5, wherein the structured light emitter is arranged for scanning an underwater region.

14. The hybrid imaging system according to claim 1, wherein the structured light emitter comprises two lasers for emitting a dual laser stripe, wherein the stripes are substantially parallel to a movement path of the imaging system.

* * * * *